United States Patent
Wang

(10) Patent No.: US 12,184,721 B2
(45) Date of Patent: Dec. 31, 2024

(54) METHOD, SYSTEM AND DEVICE FOR CDN SCHEDULING, AND STORAGE MEDIUM

(71) Applicant: ZTE CORPORATION, Guangdong (CN)

(72) Inventor: Qi Wang, Guangdong (CN)

(73) Assignee: ZTE CORPORATION, Shenzhen (CN)

(*) Notice: Subject to any disclaimer, the term of this patent is extended or adjusted under 35 U.S.C. 154(b) by 390 days.

(21) Appl. No.: 17/778,827

(22) PCT Filed: Dec. 25, 2020

(86) PCT No.: PCT/CN2020/139527
§ 371 (c)(1),
(2) Date: May 20, 2022

(87) PCT Pub. No.: WO2021/136100
PCT Pub. Date: Jul. 8, 2021

(65) Prior Publication Data
US 2022/0407914 A1   Dec. 22, 2022

(30) Foreign Application Priority Data

Dec. 31, 2019 (CN) .......................... 201911418603.2

(51) Int. Cl.
*H04L 67/1025* (2022.01)
*H04L 47/125* (2022.01)
(Continued)

(52) U.S. Cl.
CPC ........ *H04L 67/1025* (2013.01); *H04L 47/125* (2013.01); *H04L 67/101* (2013.01); *H04L 67/63* (2022.05)

(58) Field of Classification Search
None
See application file for complete search history.

(56) References Cited

U.S. PATENT DOCUMENTS 9,882,976 B1 * 1/2018 Kendall .................. H04L 67/02
2014/0359152 A1   12/2014 Heng
(Continued)

FOREIGN PATENT DOCUMENTS

CN    102291447 B  *  4/2016
CN    105872014 A      8/2016
(Continued)

OTHER PUBLICATIONS

ZTE Corporation, International Search Report with English translation, PCT/CN2020/139527, Mar. 11, 2021, 7 pgs.
(Continued)

*Primary Examiner* — Kenny S Lin
(74) *Attorney, Agent, or Firm* — MH2 TECHNOLOGY LAW GROUP LLP

(57) ABSTRACT

Embodiments of the present disclosure provide a method, system and device for content delivery network (CDN) scheduling, and a storage medium. The method includes: acquiring CDN data in real time from a CDN node device to generate a CDN index system; acquiring metropolitan area network, MAN, data in real time from a MAN to generate a MAN index system; generating a CDN node load intelligent image based on the CDN index system, and generating an intra-region scheduling algorithm through artificial intelligence, AI, training and algorithm optimization; generating a CDN region load intelligent image based on the CDN index system and the MAN index system, and generating an inter-region scheduling algorithm through the AI training and the algorithm optimization; and determining a CDN scheduling policy according to the intra-region scheduling algorithm and the inter-region scheduling algorithm, and executing the CDN scheduling policy.

20 Claims, 4 Drawing Sheets

(51) Int. Cl.
*H04L 67/101* (2022.01)
*H04L 67/63* (2022.01)

(56) References Cited

U.S. PATENT DOCUMENTS

| | | | |
|---|---|---|---|
| 2015/0012656 A1 | 1/2015 | Phillips et al. | |
| 2015/0317583 A1 | 11/2015 | Huang et al. | |
| 2018/0026938 A1* | 1/2018 | Xiang | H04L 67/289 709/245 |
| 2018/0192429 A1 | 7/2018 | Yang | |
| 2019/0140920 A1* | 5/2019 | Yan | H04L 67/101 |
| 2020/0137131 A1* | 4/2020 | Zhao | G06N 3/084 |
| 2021/0211490 A1 | 7/2021 | Zhang et al. | |

FOREIGN PATENT DOCUMENTS

| | | | | |
|---|---|---|---|---|
| CN | 106488504 A | | 3/2017 | |
| CN | 108366020 A | | 8/2018 | |
| CN | 109067670 A | | 12/2018 | |
| CN | 105872014 B | * | 2/2019 | H04L 67/1002 |
| CN | 109542613 A | | 3/2019 | |
| CN | 109547546 A | | 3/2019 | |
| CN | 109889569 A | | 6/2019 | |
| CN | 110198332 A | * | 9/2019 | H04L 41/147 |
| CN | 110233892 A | | 9/2019 | |
| CN | 110336885 A | | 10/2019 | |
| CN | 110401552 A | | 11/2019 | |
| WO | 2014082538 A1 | | 6/2014 | |
| WO | 2015001495 A1 | | 1/2015 | |

OTHER PUBLICATIONS

Chen Buhua, et al., "Discussion on Application of Artificial Intelligence in Key Technologies of CDN", Mobile Communications, Aug. 27, 2018, 8 pgs.
Chinese First Office Action dated Jul. 18, 2023 in corresponding Chinese Application No. 201911418603.2, translated, 15 pages.

* cited by examiner

METHOD, SYSTEM AND DEVICE FOR CDN SCHEDULING, AND STORAGE MEDIUM

CROSS REFERENCE TO RELATED APPLICATIONS

The present application is a United States National Stage Application filed under 35 U.S.C. § 371 of PCT Patent Application Serial No. PCT/CN2020/139527, filed Dec. 25, 2020, which claims priority to Chinese patent application No. 201911418603.2, filed Dec. 31, 2019, each of which is incorporated by reference herein in its entirety.

TECHNICAL FIELD

The various embodiments of the present disclosure relate in general to network scheduling technology, and more specifically to a method, system and device for content delivery network (CDN) scheduling, and a storage medium.

BACKGROUND

CDN is a content delivery network built on top of a network, which relies on edge servers deployed in all parts of the network to enable users to get required contents nearby via function modules such as load balancing, content delivery and scheduling modules of the central platform, thereby reducing network congestion and improving the response speed and hit rate for users' access. With the development of Internet and the fifth-generation mobile communication (5G), existing CDNs is unable to cope with new technologies and services.

With the increase of scale and the deeper marginalization and subsidence of CDN, operation and maintenance complexity of CDN are improved. A conventional operation and maintenance mode, which is based on manual work and supported by statistical report and alarm detection, has been unable to meet the needs of CDN service development. A more intelligent way is needed to improve the operation and maintenance efficiency of a CDN system and ensure the stability, reliability and service quality of the CDN system.

SUMMARY

Some embodiments of the present disclosure provide a method, system and device for CDN scheduling, and a storage medium.

Some embodiments of the present disclosure provide a method for content delivery network (CDN) scheduling, including: acquiring CDN data in real time from a CDN node device to generate a CDN index system; acquiring metropolitan area network (MAN) data in real time from a MAN to generate a MAN index system; generating a CDN node load intelligent image based on the CDN index system, and generating an intra-region scheduling algorithm through artificial intelligence (AI) training and algorithm optimization; generating a CDN region load intelligent image based on the CDN index system and the MAN index system, and generating an inter-region scheduling algorithm through the AI training and the algorithm optimization; and determining a CDN scheduling policy according to the intra-region scheduling algorithm and the inter-region scheduling algorithm, and executing the CDN scheduling policy.

Some embodiments of the present disclosure provide a system for content delivery network (CDN) scheduling, including: a CDN index module, configured to acquire CDN data in real time from a CDN node device to generate a CDN index system; a metropolitan area network, MAN, index module, configured to acquire MAN data in real time from a MAN to generate a MAN index system; an intra-region scheduling module, configured to generate a CDN node load intelligent image based on the CDN index system, and generate an intra-region scheduling algorithm through artificial intelligence (AI) training and algorithm optimization; an inter-region scheduling module, configured to generate a CDN region load intelligent image based on the CDN index system and the MAN index system, and generate an inter-region scheduling algorithm through the AI training and the algorithm optimization; and a policy execution module, configured to determine a CDN scheduling policy according to the intra-region scheduling algorithm and the inter-region scheduling algorithm, and execute the CDN scheduling policy.

Some embodiments of the present disclosure provide a device for content delivery network (CDN) scheduling including at least one processor and a memory, wherein the at least one processor is configured to execute program instructions stored in the memory to perform the method for CDN scheduling described above.

Some embodiments of the present disclosure provide a computer readable storage medium on which a computer program is stored, wherein the computer program that, when executed by at least one processor, cause the at least one processor to perform the method for CDN scheduling described above.

DETAILED DESCRIPTION OF THE EMBODIMENTS

Embodiments of the present disclosure are described in detail with reference to the accompanying drawings.

The present disclosure provides a method, system and device for CDN scheduling, and a storage medium, which improve operation and maintenance efficiency of a CDN network and save costs.

Figure 1:
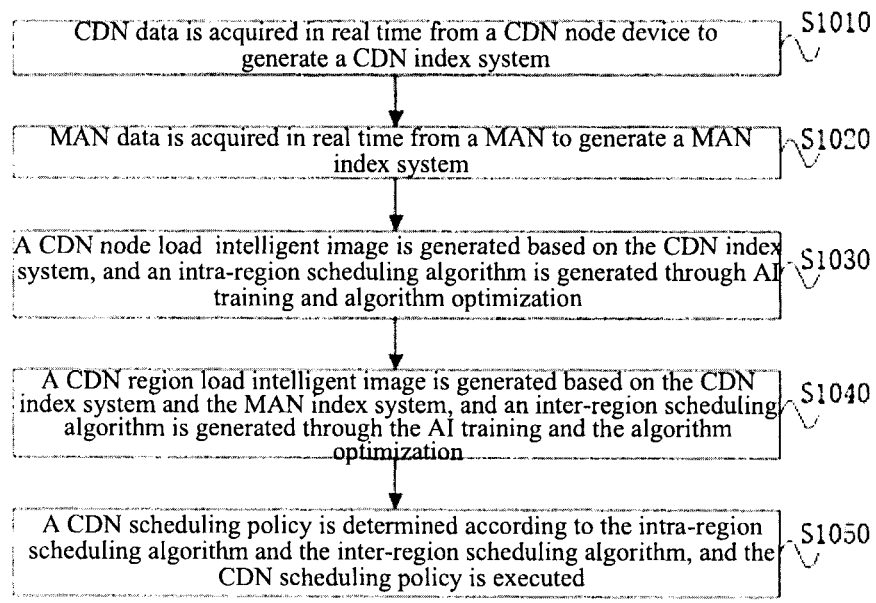
FIG. 1 is a flowchart of a method for CDN scheduling according to an embodiment.

FIG. 1 is a flowchart of a method for CDN scheduling according to an embodiment. As shown in FIG. 1, the method provided in this embodiment includes the following operations.

In S1010, CDN data is acquired in real time from a CDN node device to generate a CDN index system.

A database query method provided in this embodiment is applied to a management system in CDN. The CDN management system may be located in a management node in the CDN, and the management node in the CDN is responsible for managing and scheduling each CDN node in the CDN. Current CDN scheduling is mainly manual scheduling, which has the following several problems. 1. Insufficient evaluation system. There is no effective measurement and evaluation system to measure CDN service and scheduling effect. 2. Unbalanced load of the CDN node. Intelligent scheduling is insufficient, the scheduling relies on manual adjustment which results in poor balance effect, and an overall utilization rate is low. 3. Traffic impact of cross-region scheduling. Cross-region scheduling has no reference basis and depends on experience to determine, resulting in traffic impact of a metropolitan area network (MAN). 4. Unbalanced service of hotspots. Hotspot distribution is not intelligent enough, hotspot statistics lag and depend on manual distribution, resulting in unbalanced service of hotspots and unbalanced service of the device.

Therefore, an embodiment of the present disclosure provides a method for CDN scheduling based on artificial intelligence (AI), which realizes intelligent scheduling of a load through real-time acquisition of data in the CDN, thereby solving a current problem of the CDN scheduling.

First, an agent is deployed on the CDN node device to acquire CND data in real time through a real-time processing framework. Then the real-time processing framework generates the CDN index system.

Figure 2:
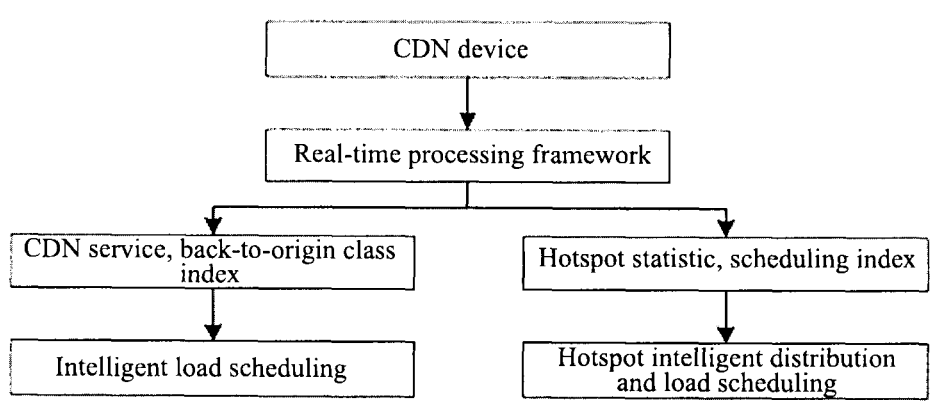
FIG. 2 is a flowchart of a CDN index system according to an embodiment.

In an embodiment, as shown in FIG. 2, FIG. 2 is a flowchart of a CDN index system according to an embodiment. The operation of acquiring the CDN data in real time from the CDN node device to generate the CDN index system includes the following operations. That is, a service log and basic device information are acquired in real time from the CDN node device, and a CDN region index, a CDN node index, quality-of-service class indexes in device dimension, balance class indexes, hotspot class indexes, and scheduling class indexes used to form the CDN index system are calculated through real-time calculation after the service log and the device basic information are aggregated and calculated. The quality-of-service class indexes include a service success rate, a service download rate and service first packet delay. The balance class indexes include a load rate and a load deviation. The hotspot class indexes include live and video-on-demand (VOD) hotspot rankings, a byte hit rate, and a hotspot storage and utilization rate. The scheduling class indexes include cross-region transferring-out users and cross-region transferring-in users.

Core indexes of the quality-of-service class are defined as follows. 1. Service success rate refers to a ratio of the number of successful user service requests to the total number of user service requests within a statistical time range, and is taken as a quality evaluation index of a stutter class. 2. Service download rate refers to the total number of bytes sent to the user per unit time of the device, and is taken as the quality evaluation index of the stutter class. 3. Service first packet delay refers to a time difference between the device receiving the user service request and sending a first packet, and is taken as a quality evaluation index of a first buffering class.

Core indexes of the load class are defined as follows. 1. Load rate refers to a ratio of a device service bandwidth to a maximum design bandwidth. 2. Load deviation refers to a difference between load rates of the same region, the same level of CDN nodes in the same region, and different devices in the same CDN node. The load deviation is classified into a region, CDN node, device peak load deviation and average load deviation. (1) The region, CDN node and device peak load deviation refers to a difference between peak values of the load rates of the region, CDN node and device within a statistical period, which generally measures a late peak balance effect. (2) The region, CDN node and device average load deviation refers to a difference between average values of the load rates of the region, CDN node and device within the statistical period, which generally measures an overall balance effect.

Core indexes of the hotspot class are defined as follows. 1. Live and VOD hotspot rankings refers to weighted rankings of service traffic proportion and request times proportion of the live broadcast channel and the VOD content within the statistical range, and is taken as the basis for hotspot value. 2. Byte hit rate refers to a ratio of service traffic of the user local hit received by the device to the total service traffic of the device, and is taken as the basis for hotspot value and effect evaluation. 3. Hotspot storage and utilization rate refers to a ratio of a total size of hotspot contents of the device to a total size of a storage media disk of the device within the statistical range, and is taken as the basis for hotspot value and effect evaluation.

Cross-region scheduling users is defined as follows. 1. Cross-region transferring-out users refers to that users in this region go to other region for service, i.e., a service user whose region attribute is inconsistent with the region attribute of the CDN node based on the region attribute of the user. 2. Cross-region transferring-in users refers to that users from other regions go to this region for service, i.e., a service user on the CDN whose region attribute is inconsistent with the region attribute of the CDN node based on the region attribute of the CDN node.

In S1020, MAN data is acquired in real time from a MAN to generate a MAN index system.

An agent is deployed on the MAN and the MAN data is acquired in real time through a real-time processing framework. Then the real-time processing framework generates the MAN system.

Figure 3:
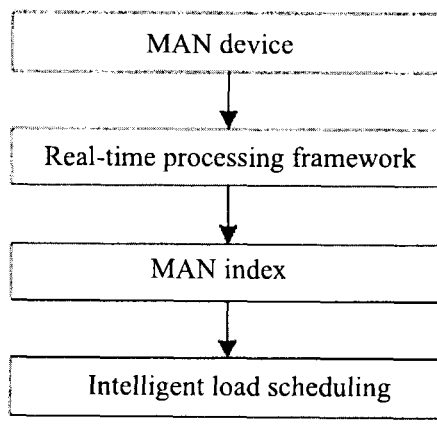
FIG. 3 is a flowchart of a metropolitan area network index system according to an embodiment.

In an embodiment, as shown in FIG. 3, FIG. 3 is a flowchart of a MAN index system according to an embodiment. The operation of acquiring the MAN data in real time from the MAN to generate the MAN index system includes the following operations. That is, data of uplink load, downlink load and delay for each region allocated to a CDN service is acquired in real time on a MAN data device to generate the MAN index system. The MAN index system includes an uplink service bandwidth, a downlink service bandwidth, a maximum design bandwidth, and delay in region dimension. The above indexes serve as the reference basis for intelligent load scheduling.

In S1030, a CDN node load intelligent image is generated based on the CDN index system, and an intra-region scheduling algorithm is generated through AI training and algorithm optimization.

The CDN scheduling may be classified into CDN intra-region scheduling and CDN inter-region scheduling. The CDN intra-region scheduling refers to scheduling in CDN of the same region, and the CDN inter-region scheduling refers to scheduling between CDNs of different regions.

According to CDN data of each node within the CDN region acquired by the CDN index system, the intelligent image of the node load within the CDN region is obtained, and the intelligent image of the node load represents a load situation of the node within the region (i.e., intra-region CDN node). Then, a method of load scheduling for the intra-region CDN nodes is determined by generating the intra-region scheduling algorithm through the AI training and algorithm optimization.

In an embodiment, a load scheduling request sent by a user is received first, data of the intra-region CDN node is acquired according to the load scheduling request, and a reference intra-region load scheduling algorithm is generated. Then, the CDN node load intelligent image e is generated based on the CDN index system, the CDN node load intelligent image is combined with the reference intra-region load scheduling algorithm through the AI training and the algorithm, and an intra-region load scheduling algorithm is obtained through iterative optimization of a dynamic baseline algorithm of a load rate and a weight of nonlinear regression.

Figure 4:
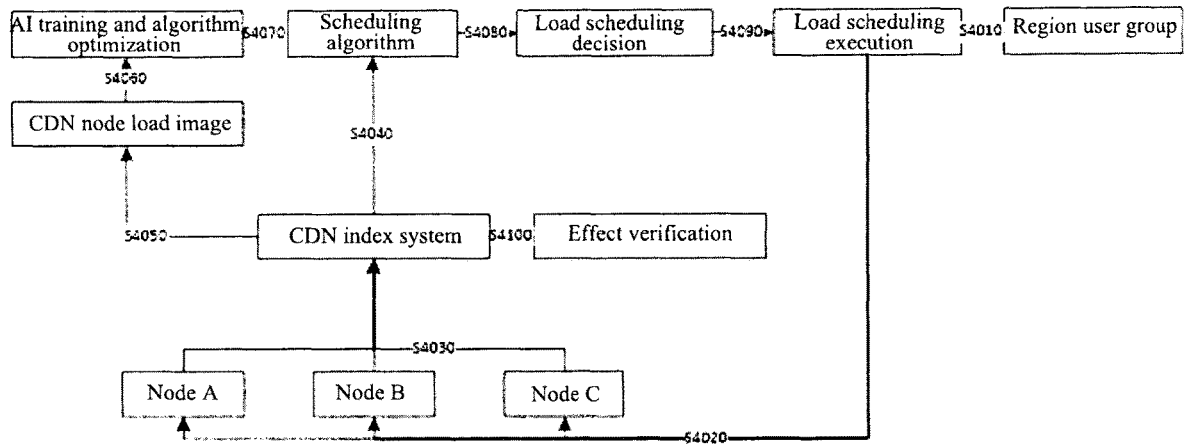
FIG. 4 is a flowchart of intra-region load scheduling according to an embodiment.

As shown in FIG. 4, FIG. 4 is a flowchart of intra-region load scheduling according to an embodiment. In S4010, the user initiates a request to a load scheduling execution module. In S4020, the load scheduling execution module distributes the load of the user to the CDN node for service according to a scheduling principle configured by the system. In S4030, the core index data of the balance class is acquired by the CDN index system in real time. In S4040, the data is output to a load scheduling algorithm module of the CDN node to generate the reference intra-region load scheduling algorithm. In 4050, a CDN node load image module acquires the core index data of the balance class acquired by the CDN index system to generate a CDN node load image. In S4060, an AI training module combines data of the CDN node load image with the load scheduling algorithm of the CDN node. In S4070, the intra-region load scheduling algorithm is continuously optimized by the dynamic baseline algorithm of a load rate and a weight of nonlinear regression. In S4080, the optimized CDN node load scheduling algorithm is output to a load scheduling decision module. In S4090, the load scheduling decision module issues, according to an interface agreed with the load scheduling execution module, the scheduling policy to the load scheduling execution module, and the load scheduling execution module distributes the user requests to the CDN node for service according to the optimized load scheduling algorithm. The system continuously repeats the above operations 4010 to 4090, continuously performs machine learning and AI training, and iteratively optimizes the intra-region load scheduling algorithm. In addition, the data is also able to be obtained from the CDN index system in real time by an effect verification module to detect the intelligent scheduling effect of the loads of multiple CDN nodes within the region.

In an embodiment, the intra-region load scheduling algorithm includes a multi-dimensional dynamic weight algorithm and a traffic jitter suppression algorithm. For the multi-dimensional dynamic weight algorithm, a dynamic weight of the CDN node is formulated as W=G (M, r), where G is a nonlinear function, M is the maximum design bandwidth of the CDN node, and r is a current remaining bandwidth of the CDN node. For the traffic jitter suppression algorithm, there are multiple CDN nodes within a region, and a probability of a specific CDN node being allocated is formulated as P=H (W1+W2+ . . . +Wn), where H is a linear function, Wi is a dynamic weight of the CDN node to be allocated, and W1+W2+ . . . +Wn is a sum of the dynamic weights of all CDN nodes.

The AI training and optimization algorithm (i.e., a trend analysis algorithm) includes: the dynamic baseline algorithm systematically generating new data of the intra-region CDN node according to a load rate baseline of the intra-region CDN node established according to historical data and through setting upper and lower thresholds of the load deviation of the intra-region CDN node, and automatically updating the load rate baseline and the upper and lower thresholds of the load deviation of the intra-region CDN node; for different CDN nodes, establishing different threshold criterions of load deviations and different service weights of the different CDN nodes by applying a statistical rule.

Evaluation indexes of the intra-region load scheduling algorithm include the following. 1. Load rate refers to a ratio of the device service bandwidth to the maximum design bandwidth. 2. Load deviation of the intra-region CDN node refers to the load deviation of CDN nodes at the same level in the same region, which is classified into a CDN node peak load deviation and an CDN node average load deviation. (1) The CDN node peak load deviation refers to a difference between peak values of load rates of CDN nodes within a statistical period, which measures a late peak balance effect. (2) The CDN node average load deviation refers to a difference between average values of load rates of the CDN nodes in the statistical period, which measures an overall balance effect.

In S1040, a CDN region load intelligent image is generated based on the CDN index system and the MAN index system, and an inter-region scheduling algorithm is generated through the AI training and the algorithm optimization.

The CDN inter-region scheduling refers to a scheme for scheduling in CDNs of different regions. According to CDN data of each node in the CDN region acquired by the CDN index system and the MAN data acquired by the MAN index system, the CDN region load intelligent image is obtained. The CDN region load intelligent image represents the load situation of the inter-region CDN node. Therefore, a method of load scheduling for the inter-region CDN nodes is determined by generating the inter-region scheduling algorithm through the AI training and algorithm optimization. Compared with the intra-region load intelligent scheduling process, the inter-region load intelligent scheduling process adds an index service bandwidth, load rate, delay and schedulable bandwidth threshold data as decision factors of the scheduling algorithm.

In an embodiment, load scheduling requests sent by users in each region are received, and data of CDN nodes in each region is acquired according to the load scheduling requests. The MAN data is acquired in real time according to the MAN index system. A CDN region load intelligent image is generated according to the data of CDN nodes in each region and the MAN data. The inter-region load scheduling algorithm is obtained based on the CDN region load intelligent image and by passing the CDN node load intelligent image through a dynamic baseline algorithm of a load rate and a service weight of nonlinear regression via the AI training and algorithm optimization.

Figure 5:
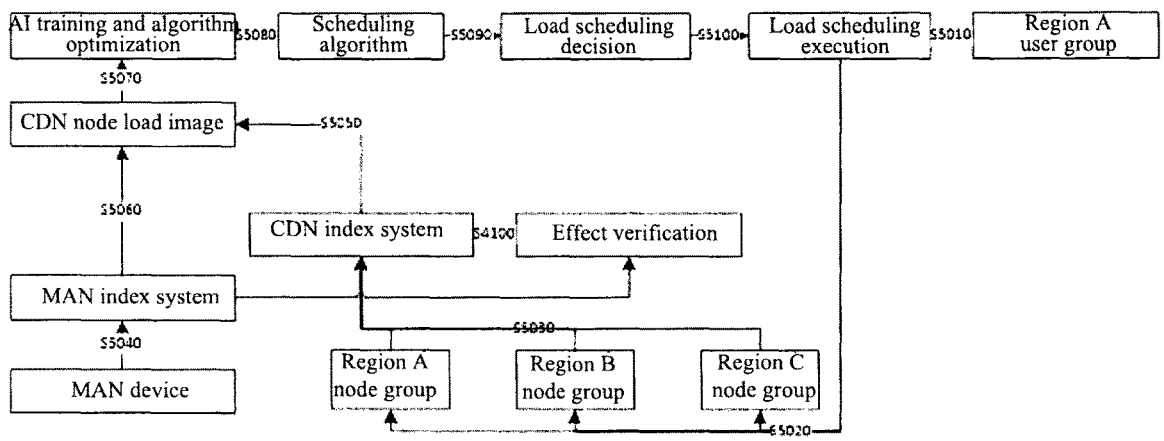
FIG. 5 is a flowchart of inter-region load scheduling according to an embodiment.

As shown in FIG. 5, FIG. 5 is a flowchart of inter-region load scheduling according to an embodiment. In S5010, users in each region initiate requests to the load scheduling execution module. In S5020, the load scheduling execution module distributes the load of the user to CDN nodes in the same region for service according to the scheduling principle configured by the system. In S5030, the core index data of the balance class is acquired by the CDN index system in real time. In S5040, the MAN index system acquires data of the MAN data device in real time, and the indexes include region-dimension uplink and downlink service bandwidths, a maximum design bandwidth, and delay, etc. In S5050, the CDN index system acquires the core index data of the balance class, and outputs the core index data to the CDN region load image module. In S5060, the MAN index system acquires data of the MAN data device in real time and outputs the data to the CDN region load image module to jointly form the region load image of the core indexes such as a CDN region dimension service bandwidth and load rate. In S5070, the region load image uses the dynamic baseline algorithm of the load rate and service weight of nonlinear regression in general. In S5080, the CDN region load scheduling algorithm is generated. In S5090, the generated CDN region load scheduling algorithm is output to the load scheduling decision module. In S5100, the load scheduling decision module issues, according to the interface agreed with the load scheduling execution module, the scheduling policy to the load scheduling execution module, and the load scheduling execution module distributes the user requests to the region CDN node for service according to the optimized load scheduling algorithm.

In an embodiment, the inter-region scheduling algorithm includes the following operations.

1. Region load rate scheduling threshold refers to participating in region scheduling in response to the region load rate exceeds the threshold.

2. Region load deviation refers to the region load rate minus the region load rate scheduling threshold. A positive value indicates that the user needs to be transferred out, and a negative value indicates that the user is able to be transferred in.

3. Region load deviation threshold refers to a threshold value preset by the system in order to prevent load oscillation. In response to an absolute value of the region load deviation being less than or equal to the region load deviation threshold, it indicates not participating in the region scheduling.

4. Pre-scheduling bandwidth calculation refers to the maximum design bandwidth of participating in the region scheduling multiplied by the region load deviation. A positive value indicates that the region needs to reduce the load rate and schedule users in this region to other regions for service. A negative value indicates that the region needs to increase the load rate and schedule users in other regions to this region for service.

5. MAN region uplink and downlink thresholds refer to the uplink and downlink thresholds of the MAN region preset by the system in order to prevent CDN traffic from causing impact to the MAN due to cross-region excessive scheduling. And the region scheduling bandwidth is limited to be less than or equal to the uplink and downlink thresholds of the MAN region.

6. Region actual scheduling bandwidth calculation, which further includes the following operations.

1) The pre-scheduling bandwidth of each region, the service bandwidth and the maximum design bandwidth of the MAN region, data of the uplink and downlink thresholds of the MAN region are included in a calculation model. A region transfer-out bandwidth and region transfer-in bandwidth needs to be less than or equal to the uplink and downlink thresholds of the MAN region.

2) The region transfer-out bandwidth (users in this region are scheduled to other regions for service) is compared with the downlink threshold of the MAN region, and a smaller value is taken as an available region transfer-out bandwidth. The region transfer-in bandwidth (users in other regions are scheduled to this region for service) is compared with the uplink threshold of the MAN region, and a smaller value is taken as an available region transfer-in bandwidth.

3) A smaller value of total region transfer-out bandwidth and a total region transfer-in bandwidth is taken to make the total region transfer-out bandwidth be equal to the total region transfer-in bandwidth.

4) The newly obtained total region transfer-out bandwidth is re-normalized according to the available region transfer-out bandwidth to obtain an actual region transfer-out bandwidth. The newly obtained total region transfer-in bandwidth is re-normalized according to the available region transfer-in bandwidth to obtain an actual region transfer-in bandwidth.

7. Region scheduling allocation algorithm. The allocation starts from the region with the highest weight of requiring the transfer-out bandwidth to an available transfer-in bandwidth region with the lowest delay according to a delay situation of the MAN, and the allocation is based on a maximum capability allocation principle. And so on until all transfer-out bandwidth and transfer-in bandwidth are allocated.

8. CDN inter-region scheduling algorithm is generated by combining the region scheduling allocation algorithm with data of the CDN region load rate (region multi-dimensional dynamic weight algorithm), i.e., $W=G (M1, R1)+G (M2, R2)$, where G is a nonlinear function, M1 and M2 are the maximum available bandwidths of the region and the MAN respectively, and R1 and R2 are the available bandwidths of the region and the MAN respectively.

9. Dynamic baseline algorithm of the region load rate and weight of nonlinear regression (i.e., trend analysis algorithm). The dynamic baseline algorithm generates new data of the region according to a load rate baseline of the region established according to historical data and through setting upper and lower thresholds of the load deviation of the region, and the load rate baseline and the upper and lower thresholds of the load deviation of the region are automatically updated. For different regions, different threshold criterions of load deviations and different allocation weights of the regions are established by applying a statistical rule.

In S1050, a CDN scheduling policy is determined according to the intra-region scheduling algorithm and the inter-region scheduling algorithm, and the CDN scheduling policy is executed.

After obtaining the intra-region scheduling algorithm and the inter-region scheduling algorithm according to the operation S1030 and operation S1040, each scheduling algorithm is able to be executed to implement CDN intelligent scheduling. In this embodiment, CDN intelligent scheduling based on AI technology is adopted to greatly improve the degree, effectiveness and rationality of operation and maintenance intelligence in CDN network service, make full use of the service capability of the existing system, and reduce the construction cost and human maintenance cost. The intra-region load intelligent scheduling strategy and scheduling execution balance the load of CDN nodes within the region, and improve the utilization rate of CDN nodes. The cross-region intelligent scheduling strategy in combination with the load and delay of the MAN achieves service requirements for emergency and cross-domain traffic support through reasonable cross-domain user service.

According to the method for CDN scheduling provided in this embodiment, CDN data is acquired in real time from a CDN node device to generate a CDN index system, and the MAN data is acquired in real time from the MAN to generate the MAN index system. Then, the CDN node load intelligent image is generated based on the CDN index system, the intra-region scheduling algorithm is generated through the AI training and algorithm optimization, the CDN region load intelligent image is generated based on the CDN index system and the MAN index system, and the inter-region scheduling algorithm is generated through the AI training and the algorithm optimization. And the CDN scheduling policy is determined according to the intra-region scheduling algorithm and the inter-region scheduling algorithm, and the CDN scheduling policy is executed. In this way, the operation and maintenance efficiency of CDN is improved, the cost is reduced, the load of the CDN node is balanced in combination with the intra-region scheduling and inter-region scheduling, and the utilization rate of the CDN node is improved.

In an embodiment, after determining the CDN scheduling policy according to the intra-region scheduling algorithm and the inter-region scheduling algorithm, and executing the CDN scheduling policy, the method further includes operations of evaluating cross-region transfer-out user service index and cross-region transfer-in user service index, and feeding an evaluation result back to the AI training and the algorithm optimization. In this way, a complete set of CDN index system is formed, which quickly evaluates the service situation of the CDN system and provides index evaluation basis for effect verification.

A specific evaluation method may include the following operations. 1. Cross-region transfer-out user service index. According to the cross-region transfer-out user calculation mode in the second embodiment, the transfer-out service index in region dimension is generated. The region transfer-out index includes a service bandwidth, concurrent user, service success rate, first packet delay, service download rate, etc. 2: Cross-region transfer-in user service index. According to the cross-region transfer-in user calculation mode in the second embodiment, the transfer-in service index in region dimension is generated, and the region transfer-in index includes a service bandwidth, concurrent user, service success rate, first packet delay, service download rate, etc.

In an embodiment, the method for CDN scheduling provided in the embodiment of the present disclosure further includes the following operations. That is, live and VOD data of the CDN node device is acquired in real time to generate a hotspot statistic basic image of the CDN node device, hotspot prediction is performed according to the hotspot statistic basic image, a hotspot prediction image is generated, and a hotspot intelligent distribution algorithm is generated through the AI training and the algorithm optimization. The operations of determining the CDN scheduling policy according to the intra-region scheduling algorithm and the inter-region scheduling algorithm, and executing the CDN scheduling policy further include the following operation. That is, the CDN scheduling policy is determined according to the intra-region scheduling algorithm, the inter-region scheduling algorithm and the hotspot intelligent distribution algorithm, and the CDN scheduling policy is executed. Live and VOD hotspots are intelligently identified and distributed, in combination with the load and storage of the CDN node and device, the hotspots are intelligently and dynamically created and rollbacked, and cold chips centralize the service and storage, thereby increasing the hit rate of the edge CDN node and balancing the device load deviation.

Figure 6:
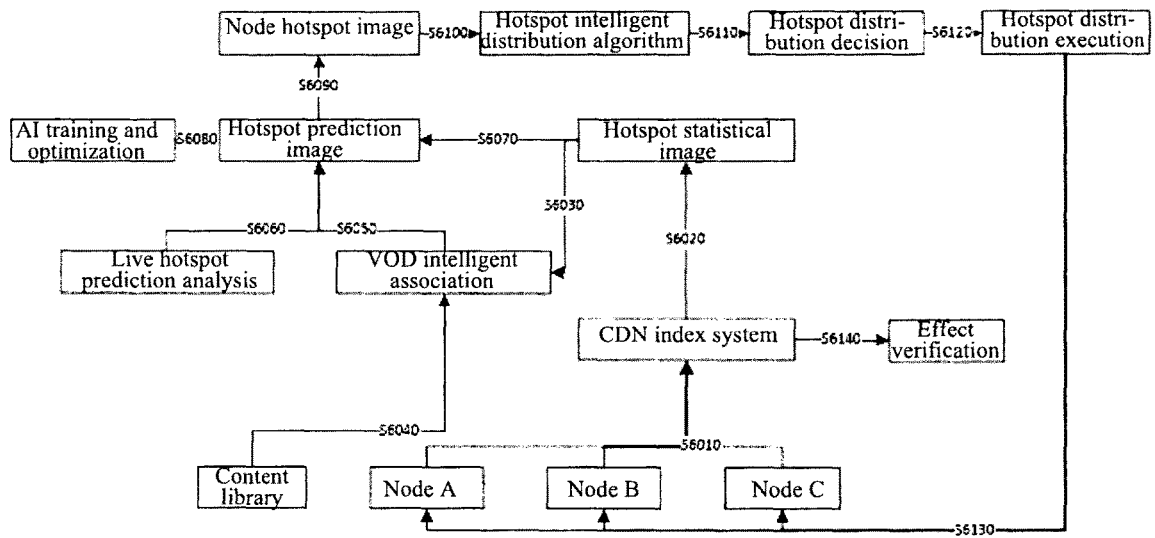
FIG. 6 is a flowchart of hotspot prediction and intelligent distribution according to an embodiment.

FIG. 6 is a flowchart of hotspot prediction and intelligent distribution according to an embodiment. In S6010, the CDN index system acquires data of live and VOD contents of the CDN device in real time. In S6020, hotspot statistical basic images in global, regional, and CDN node dimensions. The hotspot statistical basic image is classified into a static image and a dynamic image, and basic elements of the live image include a channel ID, content features, region features, event features, etc. The basic elements of the VOD image include information such as a content ID, content name, director, actor, etc. The static image is generated according to historical statistics long-period (such as day granularity) data, and the dynamic image is generated according to real-time (such as minute level) statistics data. The dynamic image incrementally updates the hotspot data of the static image in real time. In S6030, a VOD intelligent association module performs content similarity analysis from content data in a content library in S6040 according to the content data of the hotspot statistical image, and generates VOD hotspot prediction data through a classical Bayesian network model. The prediction analysis of live broadcast hotspots mainly aims at the major events including national major festivals, celebrations and competitions. Through a hotspot analysis engine, an analysis result is associated with live broadcast channels, and prediction data of live broadcast hotspots are generated through the classical Bayesian network model. In S6050, the hotspot prediction image acquires VOD hotspot prediction data. In S6060, the live hotspot prediction data is acquired. In S6070, the hotspot statistical image data is acquired to generate the hotspot prediction image. In S6080, the accuracy of a hotspot association algorithm, a live prediction algorithm and the hotspot prediction image is continuously optimized through the AI training and optimization. In S6090, a CDN node intelligent image in CDN node dimension is finally generated. In S6100, the CDN node intelligent image generates the hotspot intelligent distribution algorithm according to the live hotspots and the VOD hotspots in combination with the load, storage, hit rate and other data of the CDN node, and outputs hotspot intelligent distribution algorithm a hotspot distribution decision module in S6110. In S6120, the hotspot distribution decision module generates full and incremental interface data according to the interface agreed with the hotspot distribution execution module, and issues a hotspot distribution policy to the CDN node for execution through the hotspot distribution execution module. In S6140, the CDN node executes live broadcast and hotspot automatic creation and aging policies according to the issued hotspot distribution policy. An effect verification module acquires the data of CDN index system and evaluates the intelligent distribution effect of hotspots.

In an embodiment, the live and VOD hotspot distribution algorithm may include the following operations.

1. Four models of global, regional, CDN node and device hotspot are established.

1) The global hotspot model mainly acquires data of CDN nodes in the whole network, which aims at new prediction hotspots of the live broadcast and VOD as well as a live channel and VOD content data of global TOPN (N is configurable).

2) The regional hotspot model mainly acquires data of CDN nodes in this region, and forms regional live and VOD hotspot ranking based on a live channel and VOD content data of regional TOPN (N is configurable).

3) The CDN node hotspot model mainly acquires all the live channels and content data of the CDN node, and forms live and VOD hotspot ranking of the CDN node.

4) The CDN device hotspot model mainly dynamically allocates, via the CDN node hotspot model, live channel and VOD content data of the device according to the load and storage of the device, and forms live and VOD hotspot ranking of CDN device TOPN (N is configurable).

2. The CDN node hotspot distribution algorithm is classified into live broadcast and VOD.

1) Intelligent distribution algorithm of live broadcast hotspot. The global hotspot model takes a live hotspot TOPN (N is variable) and a live prediction hotspot, the regional hotspot model takes a live hotspot TOPM (M is variable), the CDN node hotspot model takes a CDN node live hotspot TOPL (L is variable). Three types of data of TOPN, TOPM and TOPL are deduplicated, arranged in a union set and re-ranked to form a new CDN node live hotspot list.

2) Intelligent distribution algorithm of VOD hotspot. The global hotspot model takes a VOD hotspot TOPA (A is variable) and a VOD prediction hotspot, the regional hotspot model takes a VOD hotspot TOPB (B is variable), the CDN node hotspot model takes a CDN node VOD TOPC (C is variable). Three types of data of TOPA, TOPB and TOPC are deduplicated, arranged in a union set and re-ranked to form a new CDN node VOD hotspot list, and the new CDN node VOD hotspot list is dynamically adjusted based on a VOD byte hit rate and storage utilization rate of the CDN node.

3. For the device in the CDN node, hottest hotspot channels and contents are quickly created and copied to all devices according to the device load and storage situations and the node hotspot list, and second hottest hotspot channels and contents are stored in a mutually exclusive manner.

4. For the last channel and content in the live and VOD hotspot list, they are created in a fixed CDN node in a centralized manner. The user requests to be re-directed to the CDN node to provide services in the centralized manner.

5. Both live and VOD hotspot aging strategies are executed according to the live and VOD hotspot list.

Figure 7:
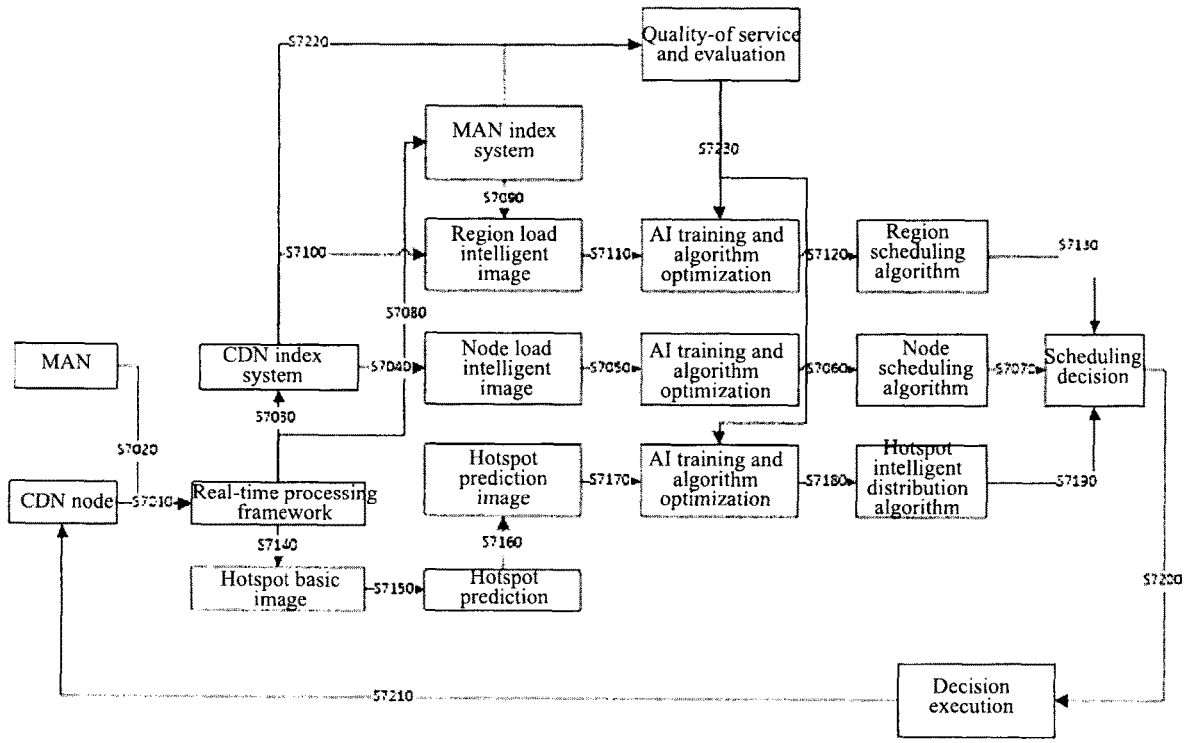
FIG. 7 is a flowchart of another method for CDN scheduling according to an embodiment.

FIG. 7 is a flowchart of another method for CDN scheduling according to an embodiment. As shown in FIG. 7, the method provided in this embodiment includes the following operations.

The method for CDN scheduling provided in this embodiment may be divided into six parts.

The first part is an acquisition part of basic real-time data. The agent is deployed on the CDN node device and the MAN data, and the real-time processing framework module acquires the CDN data in real time (operation S7010) and acquires the MAN data in real time (operation S7020).

The second part is an establishment part of three basic data indexes. The real-time processing frame module outputs CDN index systems (operation S7030), MAN index systems (operation S7080) and hotspot basic images (operation S7140) in various dimensions.

The third part is a decision-making process of node intelligent scheduling. The CDN node scheduling algorithm is initiated. The CDN node load intelligent image is generated based on the CDN index system (operation S7040). The node scheduling algorithm (operation S7060) is optimized through the AI training and algorithm optimization module (operation S7050), and is output to the scheduling decision module (operation S7070).

The fourth part is a decision-making process of region intelligent scheduling. The region scheduling algorithm is initiated. The CDN region load intelligent image is generated based on the CDN index system (operation S7100) and the MAN index system (operation S7090). The region scheduling algorithm (operation S7120) is optimized through the AI training and algorithm optimization module (operation S7110), and is output to the scheduling decision module (operation S7130).

The fifth part is a decision-making process of hotspot prediction and intelligent distribution. The hotspot distribution algorithm is initiated. The hotspot prediction module generates a multi-dimensional hotspot prediction image (operation S7160) according to the hotspot basic image (operation S7150). A new hotspot intelligent distribution algorithm (operation S7180) is generated through the AI training and algorithm optimization module (operation S7170), and is output to the scheduling decision module (operation S7190).

The sixth part is decision execution, effect evaluation and vector feedback. The scheduling decision module sends the policy to the CDN scheduling execution module through the negotiated interface (operation S7200), the CDN scheduling execution module executes the load scheduling policy and the hotspot intelligent distribution policy according to the new policy (operation S7210). The CDN index system and the MAN index system obtain new data and report the new data to a service measurement and evaluation module (operation S7220). The service measurement and evaluation module generates vectors according to an evaluation principle and feeds them back to the AI training and algorithm optimization module (operation S7230). The whole system forms a closed-loop process and is constantly iterated.

Figure 8:
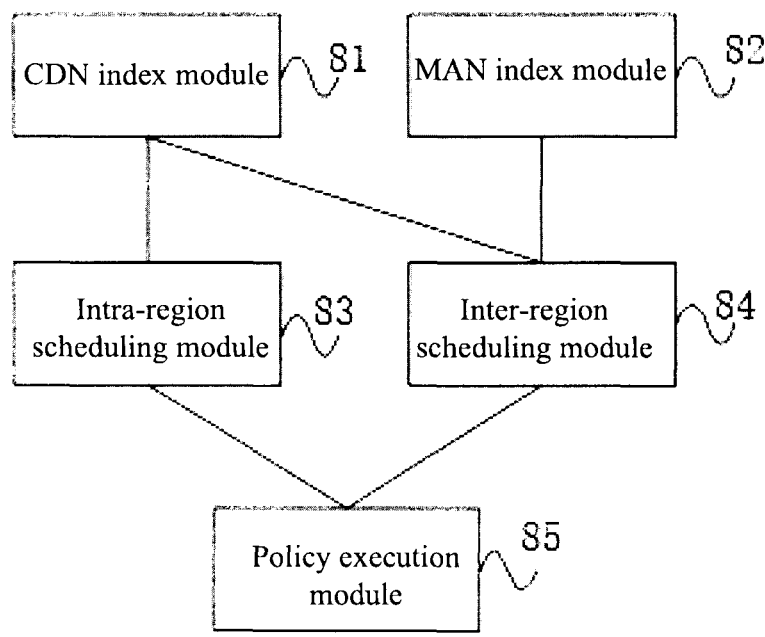
FIG. 8 is a schematic structural diagram of a system for CDN scheduling according to an embodiment.

FIG. 8 is a schematic structural diagram of a system for CDN scheduling according to an embodiment. As shown in FIG. 8, the system for CDN scheduling provided in this embodiment includes the following modules.

A CDN index module 81 is configured to acquire CDN data in real time from a CDN node device to generate a CDN index system. A metropolitan area network, MAN, index module 82 is configured to acquire MAN data in real time from a MAN to generate a MAN index system. An intra-region scheduling module 83 is configured to generate a CDN node load intelligent image based on the CDN index system, and generate an intra-region scheduling algorithm through artificial intelligence, AI, training and algorithm optimization. An inter-region scheduling module 84 is configured to generate a CDN region load intelligent image based on the CDN index system and the MAN index system, and generate an inter-region scheduling algorithm through the AI training and the algorithm optimization. And a policy execution module 85 is configured to determine a CDN scheduling policy according to the intra-region scheduling algorithm and the inter-region scheduling algorithm, and execute the CDN scheduling policy.

The system for CDN scheduling provided in this embodiment is configured to implement the method for CDN scheduling in the embodiment shown in FIG. 1. The implementation principle and technical effect of the system for CDN scheduling provided in this embodiment are similar to those of the method for CDN scheduling, and details are not repeated herein.

In an embodiment, the method and system for intelligent CDN scheduling provided in this embodiment may be divided into three core modules: a CDN index system module, a load intelligent scheduling module, and a hotspot intelligent distribution module.

1. Index system module. This module realizes real-time acquisition of raw data, and forms a set of complete and multi-dimensional index monitoring and evaluation systems of CDN service, back to origin, cross-domain service and other scenarios.

2. Load intelligent scheduling module including two sub-modules. An intra-region intelligent scheduling sub-module, configured to establish the load intelligent image in intra-region CDN node dimension, and be responsible for load balancing of multiple intra-region CDN nodes. An inter-region intelligent scheduling sub-module, configured to establish the load intelligent image in region dimension, and be responsible for cross-region CDN traffic scheduling and inter-region load balancing.

3. Hotspot intelligent distribution module including two sub-modules. A live hotspot prediction and intelligent distribution sub-module, configured to establish the live hotspot intelligent image in CDN node dimension, dynamically create the hotspots to the CDN node, and update the creation and aging strategy according to the change of the hotspots. A VOD hotspot analysis and intelligent distribution submodule, configured to establish the VOD hotspot intelligent image in CDN node dimension, dynamically create the hotspots to the CDN node, and update the creation and aging strategy according to the change of the hotspots.

Figure 9:
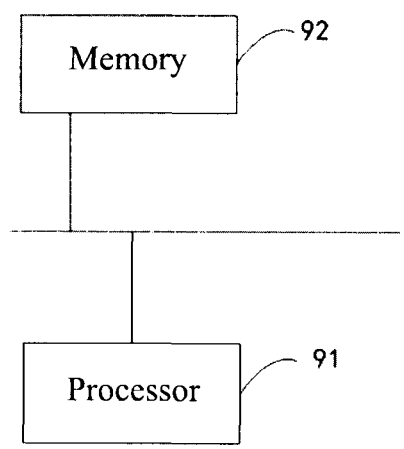
FIG. 9 is a schematic structural diagram of a device for CDN scheduling according to an embodiment.

FIG. 9 is a schematic structural diagram of a device for CDN scheduling according to an embodiment. As shown in FIG. 9, the device for CDN scheduling includes at least one processor 91 and a memory 92. The number of the at least one processor 91 in the device for CDN scheduling may be one or more. FIG. 9 shows an example of one processor 91. The processor 91 and the memory 92 in the device for CDN scheduling may be connected by a bus or other means.

As a computer readable storage medium, the memory 92 may be configured to store a software program, a computer executable program, and modules, such as program instructions/modules (e.g., the CDN index module 81, the MAN index module 82, the intra-region scheduling module 83, the inter-region scheduling module 84, and the policy execution module 85 in the system for CDN scheduling) corresponding to the method for CDN scheduling in the embodiment of FIG. 1 of the present disclosure. The processor 91 implements at least one function application and data processing of the device for CDN scheduling by executing a software program, instructions, and modules stored in the memory 92, i.e., implements the method for CDN scheduling described above.

The memory 92 mainly includes a program storage region and a data storage region. The program storage region may store an operating system, an application program required for at least one function. The data storage region may store data or the like generated according to the use of the optical network controller. Furthermore, the memory 92 may include high-speed random access memory, and may further include non-volatile memory, such as at least one disk storage device, a flash memory device, or other non-volatile solid-state storage device.

Embodiments of the present disclosure further provide a computer readable storage medium including computer executable instructions that, when executed by a computer processor, cause the computer processor to perform the method for CDN scheduling. The method includes: acquiring CDN data from a CDN node device in real time to generate a CDN index system; acquiring metropolitan area network, MAN, data from a MAN in real time to generate a MAN index system; generating a CDN node load intelligent image based on the CDN index system, and generating an intra-region scheduling algorithm through artificial intelligence, AI, training and algorithm optimization; generating a CDN region load intelligent image based on the CDN index system and the MAN index system, and generating an inter-region scheduling algorithm through the AI training and the algorithm optimization; and determining a CDN scheduling policy according to the intra-region scheduling algorithm and the inter-region scheduling algorithm, and executing the CDN scheduling policy.

The above description merely includes exemplary embodiments of the present disclosure, and is not intended to limit the protection scope of the present disclosure.

Those skilled in the art should appreciate that the term 'terminal device' covers any suitable type of wireless user equipment, such as a mobile phone, a portable data processing device, a portable web browser or an in-vehicle mobile station.

In general, various embodiments of the present disclosure may be implemented in hardware or dedicated circuit, software, logic, or any combination thereof. For example, some aspects may be implemented in hardware, while other aspects may be implemented in firmware or software that may be executed by a controller, microprocessor, or other computing device, although the present disclosure is not limited thereto.

Embodiments of the present disclosure may be implemented by a data processor of a mobile device executing computer program instructions, such as in a processor entity, either by hardware, or by a combination of software and hardware. Computer program instructions may be assembly instructions, instruction set architecture (ISA) instructions, machine instructions, machine-related instructions, microcode, firmware instructions, status setting data, or source or target code written in any combination of one or more programming languages.

A block diagram of any logic flow in the accompanying drawings of the present disclosure may represent program operations, or may represent interconnected logic circuits, modules, and functions, or may represent a combination of program operations with logic circuits, modules, and functions. A computer program may be stored in memory. The memory may have any type suitable for a local technical environment and may be implemented using any suitable data storage technology, such as, but not limited to, read only memory (ROM), random access memory (RAM), optical memory devices and systems (digital versatile discs (DVD) or compact discs (CD). The computer readable medium may include a non-transitory storage medium. The data processor may be any type suitable for a local technical environment, such as, but not limited to, a general-purpose computer, a special purpose computer, a microprocessor, a digital signal processor (DSP), an application specific integrated circuit (ASIC), a field-programmable gate array (FGPA), and a processor based on a multi-core processor architecture.

What is claimed is:

1. A method for content delivery network (CDN) scheduling, comprising:
   acquiring CDN data in real time from a CDN node device to generate a CDN index system;
   acquiring metropolitan area network (MAN) data in real time from a MAN to generate a MAN index system;
   generating a CDN node load intelligent image based on the CDN index system, and generating an intra-region scheduling algorithm through artificial intelligence (AI) training and algorithm optimization;
   generating a CDN region load intelligent image based on the CDN index system and the MAN index system, and generating an inter-region scheduling algorithm through AI training and algorithm optimization; and
   determining a CDN scheduling policy according to the intra-region scheduling algorithm and the inter-region scheduling algorithm, and executing the CDN scheduling policy.

2. The method according to claim 1, wherein acquiring the CDN data in real time from the CDN node device to generate the CDN index system comprises:
   acquiring a service log and basic device information in real time from the CDN node device; and
   calculating a CDN region index, a CDN node index, quality-of-service class indexes in device dimension, balance class indexes, hotspot class indexes, and scheduling class indexes used to form the CDN index system through real-time calculation after the service log and the device basic information are aggregated and calculated;

wherein the quality-of-service class indexes comprise a service success rate, a service download rate and service first packet delay, the balance class indexes comprise a load rate and a load deviation, the hotspot class indexes comprise live and on-demand hotspot rankings, a byte hit rate, and a hotspot storage and utilization rate, and the scheduling class indexes comprise cross-region transferring-out users and cross-region transferring-in users.

3. The method according to claim 1, wherein acquiring the MAN data in real time from the MAN to generate the MAN index system comprises:
acquiring data of uplink load, downlink load and delay for each region allocated to a CDN service on a MAN data device in real time to generate the MAN index system, wherein the MAN index system comprises region-dimension uplink and downlink service bandwidths, a maximum design bandwidth, and delay.

4. The method according to claim 1, wherein generating the CDN node load intelligent image based on the CDN index system, and generating the intra-region scheduling algorithm through AI training and algorithm optimization comprise:
receiving a load scheduling request sent by a user, acquiring data of an intra-region CDN node according to the load scheduling request, and generating a reference intra-region load scheduling algorithm; and
generating the CDN node load intelligent image based on the CDN index system, combining the CDN node load intelligent image with the reference intra-region load scheduling algorithm through AI training and algorithm optimization, and obtaining an intra-region load scheduling algorithm through iterative optimization of a dynamic baseline algorithm of a load rate and a weight of nonlinear regression.

5. The method according to claim 4, wherein:
the intra-region load scheduling algorithm comprises a multi-dimensional dynamic weight algorithm and a traffic jitter suppression algorithm;
the AI training and algorithm optimization used to generate the intra-region scheduling algorithm comprises: the dynamic baseline algorithm systematically generating new data of the intra-region CDN node according to a load rate baseline of the intra-region CDN node established according to historical data and through setting upper and lower thresholds of the load deviation of the intra-region CDN node, and automatically updating the load rate baseline and the upper and lower thresholds of the load deviation of the intra-region CDN node; for different CDN nodes, establishing different threshold criterions of load deviations and different service weights of the different CDN nodes by applying a statistical rule; and
the intra-region load scheduling algorithm performs evaluation according to the load rate and the load deviation of the intra-region CDN node.

6. The method according to claim 1, wherein generating the CDN region load intelligent image based on the CDN index system and the MAN index system, and generating the inter-region scheduling algorithm through AI training and algorithm optimization comprise:
receiving load scheduling requests sent by users in each region, and acquiring data of CDN nodes in each region according to the load scheduling requests;
acquiring the MAN data in real time according to the MAN index system;
generating the CDN region load intelligent image according to the data of the CDN nodes in each region and the MAN data; and
obtaining the inter-region load scheduling algorithm based on the CDN region load intelligent image and by passing the CDN node load intelligent image through a dynamic baseline algorithm of a load rate and a service weight of nonlinear regression via AI training and algorithm optimization.

7. The method according to claim 6, wherein:
the inter-region load scheduling algorithm comprises: a region load rate scheduling threshold, a region load deviation, a region load deviation threshold, pre-scheduling bandwidth calculation, uplink and downlink thresholds of a MAN region, region actual scheduling bandwidth calculation, a region scheduling allocation algorithm, a CDN inter-region scheduling algorithm;
the AI training and algorithm optimization used to generate the inter-region scheduling algorithm includes: a dynamic baseline algorithm generating new data of the region according to a load rate baseline of the region established according to historical data and through setting upper and lower thresholds of the load deviation of the region, and automatically updating the load rate baseline and the upper and lower thresholds of the load deviation of the region; for different regions, establishing different threshold criterions of load deviations and different allocation weights of the regions by applying a statistical rule.

8. The method according to claim 1, wherein after determining the CDN scheduling policy according to the intra-region scheduling algorithm and the inter-region scheduling algorithm, and executing the CDN scheduling policy, the method further comprise:
evaluating cross-region transfer-out user service index and cross-region transfer-in user service index, and feeding an evaluation result back to AI training and algorithm optimization.

9. The method according to claim 1, further comprising:
acquiring live and on-demand data of the CDN node device in real time to generate a hotspot statistic basic image of the CDN node device; and
performing hotspot prediction according to the hotspot statistic basic image, generating a hotspot prediction image, and generating a hotspot intelligent distribution algorithm through AI training and algorithm optimization;
wherein determining the CDN scheduling policy according to the intra-region scheduling algorithm and the inter-region scheduling algorithm, and executing the CDN scheduling policy comprise:
determining the CDN scheduling policy according to the intra-region scheduling algorithm, the inter-region scheduling algorithm and the hotspot intelligent distribution algorithm, and executing the CDN scheduling policy.

10. A device for content delivery network (CDN) scheduling, comprising: at least one processor and a memory, wherein the at least one processor is configured to execute program instructions stored in the memory to perform a method for CDN scheduling; wherein the method comprises:
acquiring CDN data in real time from a CDN node device to generate a CDN index system;
acquiring metropolitan area network (MAN) data in real time from a MAN to generate a MAN index system;

generating a CDN node load intelligent image based on the CDN index system, and generating an intra-region scheduling algorithm through artificial intelligence (AI) training and algorithm optimization;

generating a CDN region load intelligent image based on the CDN index system and the MAN index system, and generating an inter-region scheduling algorithm through AI training and algorithm optimization; and determining a CDN scheduling policy according to the intra-region scheduling algorithm and the inter-region scheduling algorithm, and executing the CDN scheduling policy.

11. The device according to claim 10, wherein acquiring the CDN data in real time from the CDN node device to generate the CDN index system comprises:

acquiring a service log and basic device information in real time from the CDN node device; and calculating a CDN region index, a CDN node index, quality-of-service class indexes in device dimension, balance class indexes, hotspot class indexes, and scheduling class indexes used to form the CDN index system through real-time calculation after the service log and the device basic information are aggregated and calculated;

wherein the quality-of-service class indexes comprise a service success rate, a service download rate and service first packet delay, the balance class indexes comprise a load rate and a load deviation, the hotspot class indexes comprise live and on-demand hotspot rankings, a byte hit rate, and a hotspot storage and utilization rate, and the scheduling class indexes comprise cross-region transferring-out users and cross-region transferring-in users.

12. The device according to claim 10, wherein acquiring the MAN data in real time from the MAN to generate the MAN index system comprises:

acquiring data of uplink load, downlink load and delay for each region allocated to a CDN service on a MAN data device in real time to generate the MAN index system, wherein the MAN index system comprises region-dimension uplink and downlink service bandwidths, a maximum design bandwidth, and delay.

13. The device according to claim 10, wherein generating the CDN node load intelligent image based on the CDN index system, and generating the intra-region scheduling algorithm through AI training and algorithm optimization comprise:

receiving a load scheduling request sent by a user, acquiring data of an intra-region CDN node according to the load scheduling request, and generating a reference intra-region load scheduling algorithm; and generating the CDN node load intelligent image based on the CDN index system, combining the CDN node load intelligent image with the reference intra-region load scheduling algorithm through AI training and algorithm optimization, and obtaining an intra-region load scheduling algorithm through iterative optimization of a dynamic baseline algorithm of a load rate and a weight of nonlinear regression.

14. The device according to claim 13, wherein:

the intra-region load scheduling algorithm comprises a multi-dimensional dynamic weight algorithm and a traffic jitter suppression algorithm;

the AI training and algorithm optimization used to generate the intra-region scheduling algorithm comprises: the dynamic baseline algorithm systematically generating new data of the intra-region CDN node according to a load rate baseline of the intra-region CDN node established according to historical data and through setting upper and lower thresholds of the load deviation of the intra-region CDN node, and automatically updating the load rate baseline and the upper and lower thresholds of the load deviation of the intra-region CDN node; for different CDN nodes, establishing different threshold criterions of load deviations and different service weights of the different CDN nodes by applying a statistical rule; and the intra-region load scheduling algorithm performs evaluation according to the load rate and the load deviation of the intra-region CDN node.

15. The method according to claim 10, wherein generating the CDN region load intelligent image based on the CDN index system and the MAN index system, and generating the inter-region scheduling algorithm through AI training and algorithm optimization comprise:

receiving load scheduling requests sent by users in each region, and acquiring data of CDN nodes in each region according to the load scheduling requests;

acquiring the MAN data in real time according to the MAN index system;

generating the CDN region load intelligent image according to the data of the CDN nodes in each region and the MAN data; and obtaining the inter-region load scheduling algorithm based on the CDN region load intelligent image and by passing the CDN node load intelligent image through a dynamic baseline algorithm of a load rate and a service weight of nonlinear regression via AI training and algorithm optimization.

16. A non-transitory computer readable storage medium on which a computer program is stored, wherein the computer program that, when executed by at least one processor, cause the at least one processor to perform a method for content delivery network (CDN) scheduling; wherein the method comprises:

acquiring CDN data in real time from a CDN node device to generate a CDN index system;

acquiring metropolitan area network (MAN) data in real time from a MAN to generate a MAN index system;

generating a CDN node load intelligent image based on the CDN index system, and generating an intra-region scheduling algorithm through artificial intelligence (AI) training and algorithm optimization;

generating a CDN region load intelligent image based on the CDN index system and the MAN index system, and generating an inter-region scheduling algorithm through AI training and algorithm optimization; and determining a CDN scheduling policy according to the intra-region scheduling algorithm and the inter-region scheduling algorithm, and executing the CDN scheduling policy.

17. The non-transitory computer readable storage medium according to claim 16, wherein acquiring the CDN data in real time from the CDN node device to generate the CDN index system comprises:

acquiring a service log and basic device information in real time from the CDN node device; and calculating a CDN region index, a CDN node index, quality-of-service class indexes in device dimension, balance class indexes, hotspot class indexes, and scheduling class indexes used to form the CDN index system through real-time calculation after the service log and the device basic information are aggregated and calculated;

wherein the quality-of-service class indexes comprise a service success rate, a service download rate and service first packet delay, the balance class indexes comprise a load rate and a load deviation, the hotspot class indexes comprise live and on-demand hotspot rankings, a byte hit rate, and a hotspot storage and utilization rate, and the scheduling class indexes comprise cross-region transferring-out users and cross-region transferring-in users.

18. The non-transitory computer readable storage medium according to claim 16, wherein acquiring the MAN data in real time from the MAN to generate the MAN index system comprises:
   acquiring data of uplink load, downlink load and delay for each region allocated to a CDN service on a MAN data device in real time to generate the MAN index system, wherein the MAN index system comprises region-dimension uplink and downlink service bandwidths, a maximum design bandwidth, and delay.

19. The non-transitory computer readable storage medium according to claim 16, wherein generating the CDN node load intelligent image based on the CDN index system, and generating the intra-region scheduling algorithm through AI training and algorithm optimization comprise:
   receiving a load scheduling request sent by a user, acquiring data of an intra-region CDN node according to the load scheduling request, and generating a reference intra-region load scheduling algorithm; and
   generating the CDN node load intelligent image based on the CDN index system, combining the CDN node load intelligent image with the reference intra-region load scheduling algorithm through AI training and algorithm optimization, and obtaining an intra-region load scheduling algorithm through iterative optimization of a dynamic baseline algorithm of a load rate and a weight of nonlinear regression.

20. The non-transitory computer readable storage medium according to claim 19, wherein:
   the intra-region load scheduling algorithm comprises a multi-dimensional dynamic weight algorithm and a traffic jitter suppression algorithm;
   the AI training and algorithm optimization used to generate the intra-region scheduling algorithm comprises: the dynamic baseline algorithm systematically generating new data of the intra-region CDN node according to a load rate baseline of the intra-region CDN node established according to historical data and through setting upper and lower thresholds of the load deviation of the intra-region CDN node, and automatically updating the load rate baseline and the upper and lower thresholds of the load deviation of the intra-region CDN node; for different CDN nodes, establishing different threshold criterions of load deviations and different service weights of the different CDN nodes by applying a statistical rule; and
   the intra-region load scheduling algorithm performs evaluation according to the load rate and the load deviation of the intra-region CDN node.

* * * * *